United States Patent
Cicala (10) Patent No.: US 9,126,474 B2
(45) Date of Patent: Sep. 8, 2015

(54) MULTI-PANE WINDOW ASSEMBLY WITH TWO-SIDED FRAME AND SLIDING PANE

(75) Inventor: Robert John Cicala, Rochester Hills, MI (US)

(73) Assignee: DURA GLOBAL TECHNOLOGIES, LLC, Auburn Hills, MI (US)

( * ) Notice: Subject to any disclaimer, the term of this patent is extended or adjusted under 35 U.S.C. 154(b) by 0 days.

(21) Appl. No.: 13/313,922

(22) Filed: Dec. 7, 2011

(65) Prior Publication Data

US 2012/0137593 A1 Jun. 7, 2012

Related U.S. Application Data

(63) Continuation of application No. 11/555,808, filed on Nov. 2, 2006, now abandoned.

(60) Provisional application No. 60/839,083, filed on Aug. 21, 2006.

(51) Int. Cl.
- *B60J 10/04* (2006.01)
- *B60J 1/18* (2006.01)
- *B60J 10/00* (2006.01)
- *E05D 15/06* (2006.01)

(52) U.S. Cl.
CPC ............... *B60J 10/04* (2013.01); *B60J 1/1853* (2013.01); *B60J 10/0011* (2013.01); *E05D 15/0652* (2013.01); *E05Y 2900/55* (2013.01)

(58) Field of Classification Search
USPC ........................... 49/413, 380, 125, 440, 441
IPC ... B60J 10/04,10/0011, 1/1853; E05D 15/0652; E05Y 2900/55
See application file for complete search history.

(56) References Cited

U.S. PATENT DOCUMENTS

| | | |
|---|---|---|
| 709,660 A | 9/1902 | Apsinwall |
| 1,199,868 A | 10/1916 | Browne |
| 1,728,344 A | 9/1929 | Hellstrand |
| 1,763,603 A | 6/1930 | Donahue |
| 1,809,132 A | 6/1931 | Martin |

(Continued)

FOREIGN PATENT DOCUMENTS

| | | |
|---|---|---|
| DE | 2039313 | 5/1971 |
| DE | 3118559 A1 | 11/1982 |

(Continued)

OTHER PUBLICATIONS

Window Assembly Cross section drawing dated Jan. 7, 2004.*

(Continued)

*Primary Examiner* — Gregory Strimbu
(74) *Attorney, Agent, or Firm* — Reising Ethington P.C.; Matthew J. Schmidt; Robert E. Ford (57) ABSTRACT

A window assembly includes fixed panes, a sliding pane, and a vehicle mounting frame. The mounting frame includes a unitary, substantially full-circumference frame member. The frame member includes a show surface that may extend above or below a window opening opened and closed by the sliding pane. A reinforcement is at least partially embedded in the frame member and has a portion located behind the show surface. Interior surfaces of the fixed panes may be molded to the frame member, and the exterior surface of the fixed panes may free of the frame. A laterally outboard portion of the peripheral edge of each fixed pane may be covered by the frame member.

19 Claims, 7 Drawing Sheets

(56) References Cited

U.S. PATENT DOCUMENTS

| | | |
|---|---|---|
| 1,876,519 A * | 9/1932 | McKinney .............. 428/122 |
| 2,282,980 A | 5/1942 | Guy |
| 2,566,745 A | 9/1951 | Parsons |
| 2,597,539 A | 5/1952 | Smart |
| 2,701,162 A | 2/1955 | Kliger |
| 2,701,631 A | 2/1955 | Stouder et al. |
| 2,721,361 A | 10/1955 | Ryan et al. |
| 2,721,636 A | 10/1955 | Ordorica et al. |
| 2,770,312 A | 11/1956 | Silverman |
| 2,781,835 A | 2/1957 | Westman |
| 2,836,457 A | 5/1958 | Beerman et al. |
| 2,894,784 A | 7/1959 | Howard |
| 2,946,098 A | 7/1960 | Migneault et al. |
| 3,134,112 A | 5/1964 | Hage |
| 3,155,204 A | 11/1964 | Campbell et al. |
| 3,237,250 A | 3/1966 | Scoville |
| 3,274,740 A | 9/1966 | Hall |
| 3,332,169 A | 7/1967 | Lohr et al. |
| 3,333,362 A | 8/1967 | Kostin et al. |
| 3,376,670 A | 4/1968 | Jones |
| 3,384,997 A | 5/1968 | Heeter |
| 3,440,765 A | 4/1969 | Eskra et al. |
| 3,440,892 A | 4/1969 | Eskra |
| 3,468,738 A | 9/1969 | Deisenroth |
| 3,478,475 A | 11/1969 | Strack |
| 3,635,100 A | 1/1972 | Littmann |
| 3,759,004 A | 9/1973 | Kent |
| 3,770,312 A | 11/1973 | Shadburn |
| 3,774,363 A | 11/1973 | Kent |
| 3,808,742 A | 5/1974 | Ehret et al. |
| 3,893,260 A | 7/1975 | Cadiou |
| 3,893,261 A | 7/1975 | Cribben |
| 3,900,965 A | 8/1975 | Mummert |
| 3,947,999 A | 4/1976 | Disperens |
| 3,967,424 A | 7/1976 | Gates |
| 4,014,072 A | 3/1977 | Schumacher |
| 4,072,340 A | 2/1978 | Morgan |
| 4,081,926 A | 4/1978 | Jardin |
| 4,093,304 A | 6/1978 | Ziegler |
| 4,106,239 A | 8/1978 | Bancroft et al. |
| 4,119,341 A | 10/1978 | Cook |
| 4,124,054 A | 11/1978 | Spretnjak |
| 4,127,968 A | 12/1978 | Trulaske |
| 4,139,234 A | 2/1979 | Morgan |
| 4,157,634 A | 6/1979 | Coulston |
| 4,158,270 A | 6/1979 | Cherbourg et al. |
| 4,170,847 A | 10/1979 | Pickles |
| 4,171,594 A | 10/1979 | Colanzi |
| 4,208,755 A | 6/1980 | Shepherd |
| 4,235,117 A | 11/1980 | Pickles |
| 4,317,312 A | 3/1982 | Heideman |
| 4,325,203 A | 4/1982 | Wicks |
| 4,387,923 A | 6/1983 | Choby et al. |
| 4,389,818 A | 6/1983 | Sakamoto |
| 4,396,221 A | 8/1983 | Morgan et al. |
| 4,407,093 A | 10/1983 | Spretnjak et al. |
| 4,419,844 A | 12/1983 | Kreisfeld |
| 4,424,605 A | 1/1984 | Squires |
| 4,457,046 A | 7/1984 | Vater |
| 4,502,248 A | 3/1985 | Thomas, Jr. et al. |
| 4,505,054 A | 3/1985 | Clark et al. |
| 4,532,973 A | 8/1985 | DeFalco |
| 4,543,747 A | 10/1985 | Kaltz et al. |
| 4,569,553 A | 2/1986 | Speth |
| 4,571,278 A | 2/1986 | Kunert |
| 4,591,204 A | 5/1986 | Gallitzendoerfer et al. |
| 4,600,254 A | 7/1986 | Whalen |
| 4,606,159 A | 8/1986 | Kunert |
| 4,608,778 A | 9/1986 | Shiraishi et al. |
| 4,634,196 A | 1/1987 | Nestell |
| 4,635,398 A | 1/1987 | Nakamura |
| 4,648,636 A | 3/1987 | Reynard |
| 4,660,325 A | 4/1987 | Bauer et al. |
| 4,668,008 A | 5/1987 | Stinson |
| 4,671,013 A | 6/1987 | Friese et al. |
| 4,674,231 A | 6/1987 | Radek et al. |
| 4,692,838 A | 9/1987 | Merchant |
| 4,700,525 A | 10/1987 | Nieboer et al. |
| 4,703,099 A | 10/1987 | Regelman |
| 4,723,809 A | 2/1988 | Kida et al. |
| 4,738,052 A | 4/1988 | Yoshida |
| 4,756,767 A | 7/1988 | Soni et al. |
| 4,781,609 A | 11/1988 | Wilson et al. |
| 4,785,583 A | 11/1988 | Kawagoe et al. |
| 4,793,099 A | 12/1988 | Friese et al. |
| 4,800,681 A * | 1/1989 | Skillen et al. ............. 49/440 |
| 4,819,377 A | 4/1989 | Bauer et al. |
| 4,823,512 A | 4/1989 | Maekawa et al. |
| 4,835,907 A | 6/1989 | Heuchert |
| 4,848,570 A | 7/1989 | Gosciniak |
| 4,858,988 A | 8/1989 | Morgan et al. |
| 4,889,175 A | 12/1989 | Frey et al. |
| 4,905,345 A | 3/1990 | Lunenschloss |
| 4,920,698 A | 5/1990 | Friese et al. |
| 4,934,098 A | 6/1990 | Prouteau et al. |
| 4,941,286 A | 7/1990 | Marscholl et al. |
| 4,970,911 A | 11/1990 | Ujihara et al. |
| 4,981,926 A | 1/1991 | Pham et al. |
| 4,995,195 A | 2/1991 | Olberding et al. |
| 5,005,317 A | 4/1991 | Saint-Louis Augustin et al. |
| 5,007,201 A | 4/1991 | D'Hoore et al. |
| 5,028,082 A | 7/1991 | Kronbetter |
| 5,035,025 A | 7/1991 | Morris |
| 5,042,855 A | 8/1991 | Bennett et al. |
| 5,046,283 A | 9/1991 | Compeau et al. |
| 5,054,242 A | 10/1991 | Keys et al. |
| RE33,741 E | 11/1991 | Boissevain |
| 5,099,611 A | 3/1992 | Kracht et al. |
| 5,099,706 A | 3/1992 | Irvin |
| 5,131,349 A | 7/1992 | Keller et al. |
| 5,146,712 A | 9/1992 | Hlavaty |
| 5,154,028 A | 10/1992 | Hill et al. |
| 5,161,419 A | 11/1992 | Moy et al. |
| 5,171,051 A | 12/1992 | Yada |
| 5,215,349 A | 6/1993 | Horton |
| 5,217,786 A | 6/1993 | Keys |
| 5,228,740 A | 7/1993 | Saltzman |
| 5,236,650 A | 8/1993 | Choby et al. |
| 5,245,788 A | 9/1993 | Riegelman |
| 5,263,280 A | 11/1993 | Dilcher |
| 5,294,168 A | 3/1994 | Kronbetter |
| 5,333,411 A | 8/1994 | Tschirschwitz et al. |
| 5,345,717 A | 9/1994 | Mori et al. |
| 5,398,449 A | 3/1995 | Kobrehel et al. |
| 5,440,849 A | 8/1995 | Agrawal et al. |
| 5,442,880 A | 8/1995 | Gipson |
| 5,443,673 A | 8/1995 | Fisher et al. |
| 5,451,090 A | 9/1995 | Brodie et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,531,046 A | 7/1996 | Kollar et al. |
| 5,537,782 A | 7/1996 | Klippert et al. |
| 5,542,214 A | 8/1996 | Buening |
| 5,544,458 A | 8/1996 | Fisher et al. |
| 5,551,193 A | 9/1996 | Barnett |
| 5,581,943 A | 12/1996 | Deren et al. |
| 5,591,528 A | 1/1997 | Fisher et al. |
| 5,595,025 A | 1/1997 | MacPhail-Fausey |
| 5,611,180 A | 3/1997 | Agrawal et al. |
| 5,613,322 A | 3/1997 | Kobrehel |
| 5,613,323 A | 3/1997 | Buening |
| 5,613,325 A | 3/1997 | Mariel |
| 5,617,675 A | 4/1997 | Kobrehel |
| 5,618,080 A | 4/1997 | Sullivan |
| 5,623,785 A | 4/1997 | Mariel |
| 5,647,094 A | 7/1997 | Mariel |
| 5,657,580 A | 8/1997 | Kobrehel |
| 5,669,181 A | 9/1997 | Kollar et al. |
| 5,671,501 A | 9/1997 | Laramie |
| 5,711,112 A | 1/1998 | Barten et al. |
| 5,724,769 A | 3/1998 | Cripe et al. |
| 5,724,771 A | 3/1998 | Gipson |

(56) References Cited

U.S. PATENT DOCUMENTS

| | | | |
|---|---|---|---|
| 5,735,089 A | 4/1998 | Smith et al. | |
| 5,743,959 A | 4/1998 | Ash et al. | |
| 5,749,174 A | 5/1998 | Mariel | |
| 5,775,029 A | 7/1998 | Buening | |
| 5,784,832 A | 7/1998 | LeeVan | |
| 5,784,833 A | 7/1998 | Sponable et al. | |
| 5,787,643 A | 8/1998 | Schmuck | |
| 5,799,444 A | 9/1998 | Freimark et al. | |
| 5,799,449 A * | 9/1998 | Lyons et al. | 52/204.51 |
| 5,804,018 A | 9/1998 | Fisher et al. | |
| 5,809,706 A | 9/1998 | Neaux | |
| 5,822,921 A | 10/1998 | Griepenstroh et al. | |
| 5,822,922 A | 10/1998 | Grumm et al. | |
| 5,832,667 A | 11/1998 | Buening et al. | |
| 5,836,110 A | 11/1998 | Buening | |
| 5,839,231 A | 11/1998 | Gebhart et al. | |
| 5,864,987 A | 2/1999 | Mariel | |
| 5,864,996 A | 2/1999 | Veldman et al. | |
| 5,887,393 A | 3/1999 | Vanark et al. | |
| 5,896,704 A | 4/1999 | Neag | |
| 5,915,780 A | 6/1999 | Kobrehel et al. | |
| 5,934,022 A | 8/1999 | Faubert | |
| 5,941,022 A | 8/1999 | Schmuck | |
| 5,996,284 A | 12/1999 | Freimark et al. | |
| 6,000,814 A | 12/1999 | Nestell et al. | |
| 6,014,840 A | 1/2000 | Ray et al. | |
| 6,018,913 A | 2/2000 | Lin | |
| 6,021,605 A | 2/2000 | Laux et al. | |
| 6,032,990 A | 3/2000 | Stone et al. | |
| 6,038,819 A | 3/2000 | Klein | |
| 6,039,390 A | 3/2000 | Agrawal et al. | |
| 6,054,001 A | 4/2000 | Swanson et al. | |
| 6,086,138 A | 7/2000 | Xu et al. | |
| 6,089,646 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,120,274 A | 9/2000 | Gerig et al. | |
| 6,123,383 A | 9/2000 | Doerflinger et al. | |
| 6,123,535 A * | 9/2000 | Ash et al. | 425/125 |
| 6,125,585 A | 10/2000 | Koneval et al. | |
| 6,141,910 A | 11/2000 | Kobrehel et al. | |
| 6,158,173 A | 12/2000 | Goodrich | |
| 6,178,697 B1 | 1/2001 | Goodrich | |
| 6,203,639 B1 | 3/2001 | Swanson et al. | |
| 6,223,470 B1 | 5/2001 | Millard et al. | |
| 6,285,890 B1 | 9/2001 | Panian | |
| 6,286,261 B1 | 9/2001 | Hackstock | |
| 6,286,891 B1 | 9/2001 | Gage et al. | |
| 6,293,609 B1 | 9/2001 | Xu et al. | |
| 6,324,727 B1 | 12/2001 | Ortoleva | |
| 6,324,788 B1 | 12/2001 | Koneval et al. | |
| 6,398,396 B1 | 6/2002 | Nestell et al. | |
| 6,434,789 B1 | 8/2002 | Kruse | |
| 6,454,449 B2 | 9/2002 | Nestell et al. | |
| 6,521,083 B1 | 2/2003 | Swanson et al. | |
| 6,547,880 B1 | 4/2003 | Krueger et al. | |
| 6,591,552 B1 | 7/2003 | Rasmussen | |
| 6,599,386 B2 | 7/2003 | Swanson et al. | |
| 6,669,267 B1 | 12/2003 | Lynam et al. | |
| 6,688,659 B2 | 2/2004 | Kobrehel | |
| 6,691,464 B2 | 2/2004 | Nestell et al. | |
| 6,748,638 B2 | 6/2004 | Dedrich et al. | |
| 6,766,617 B2 | 7/2004 | Purcell | |
| 6,829,861 B1 | 12/2004 | Kobrehel et al. | |
| 6,941,700 B1 | 9/2005 | Kobrehel et al. | |
| 6,955,009 B2 | 10/2005 | Rasmussen | |
| 6,969,101 B2 | 11/2005 | Lynam et al. | |
| 7,003,916 B2 | 2/2006 | Nestell et al. | |
| 7,024,822 B2 | 4/2006 | Scheer et al. | |
| 7,073,293 B2 | 7/2006 | Galer | |
| 7,100,328 B2 | 9/2006 | Scheer et al. | |
| 7,213,370 B2 | 5/2007 | Dedrich et al. | |
| 7,234,756 B2 | 6/2007 | Lynam et al. | |
| 7,287,802 B2 | 10/2007 | Dankert et al. | |
| 2003/0066255 A1 | 4/2003 | Cripe | |
| 2003/0070371 A1 | 4/2003 | Kobrehel | |
| 2003/0107221 A1 | 6/2003 | Kobrehel | |
| 2003/0110703 A1 | 6/2003 | Kobrehel | |
| 2003/0182866 A1 | 10/2003 | Nestell et al. | |
| 2003/0188487 A1 | 10/2003 | Rasmussen | |
| 2003/0213179 A1 | 11/2003 | Galer | |
| 2004/0020131 A1 | 2/2004 | Galer et al. | |
| 2004/0075283 A1 | 4/2004 | Kobrehel | |
| 2004/0134131 A1 | 7/2004 | Galer | |
| 2005/0188622 A1 | 9/2005 | Nestell | |
| 2005/0252090 A1 | 11/2005 | Kraus et al. | |
| 2006/0107600 A1 | 5/2006 | Nestell et al. | |
| 2006/0174544 A1 | 8/2006 | DuFour et al. | |
| 2006/0175866 A1 | 8/2006 | Dankert et al. | |
| 2007/0246967 A1 | 10/2007 | Lynam et al. | |

FOREIGN PATENT DOCUMENTS

| | | |
|---|---|---|
| EP | 0037097 A1 | 10/1981 |
| EP | 0037097 B1 | 8/1983 |
| EP | 0449372 A2 | 10/1991 |
| EP | 0529815 A1 | 3/1993 |
| EP | 0646483 A1 | 4/1995 |
| EP | 0845340 A2 | 6/1998 |
| FR | 2552483 | 3/1985 |
| FR | 2552483 A1 | 3/1985 |
| JP | 1219280 | 9/1989 |
| JP | 1219280 A | 9/1989 |

OTHER PUBLICATIONS

Window Assembly Cross-Section Drawing, Jan. 7, 2004.*

*Dura Global Technologies, Inc., Dura Operating Corp., v. Magna Donnelly Corporation, a/k/a Donnelly Corporation*, Clarification to Magna Donnelly's Amended and Second Amended Invalidity and Unenforceability Contentions, Case 2:07-cv-10945-SFC-MKM, Document 497, Filed Feb. 28, 2011.

*Dura Global Technologies, Inc., Dura Operating Corp., v. Magna Donnelly Corporation, a/k/a Donnelly Corporation*, Magna Donnelly's Amended Invalidity and Unenforceability Contentions, Case 2:07-cv-10945-SFC-MKM, Document 465, Filed Jan. 14, 2011.

*Dura Global Technologies, Inc., Dura Operating Corp., v. Magna Donnelly Corporation, a/k/a Donnelly Corporation*, Magna Donnelly's Second Amended Invalidity and Unenforceability Contentions, Case 2:07-cv-10945-SFC-MKM, Document 466, Filed Jan. 17, 2011.

*Dura Global Technologies, Inc. Dura Operating Corp., v. Magna Donnelly Corporation, a/k/a Donnelly Corporation*, Magna Donnelly's Reply to Plaintiffs' Opposition to Magna Donnelly's First Motion for Partial Summary Judgment Regarding U.S. Patent No. 6,766,617 Based on the Invalidity of Claims 1 through 3, 5, 8 and 9 Pursuant to 35 USC 102(b), Case 2:07-cv-10945-SFC-MKM, Document 283, Filed Aug. 11, 2008.

*Dura Global Technologies, Inc., Dura Operating Corp., v. Magna Donnelly Corporation, a/k/a Donnelly Corporation*, Magna Donnelly's Notice of Prior Art Under 35 USC 282, Case 2:07-cv-10945-SFC-MKM, Document 332, Filed Jan. 7, 2009.

*Dura Global Technologies, Inc., Dura Operating Corp., v. Magna Donnelly Corporation, a/k/a Donnelly Corporation*, Opinion & Order Denying Defendant's First Motion for Partial Summary Judgement Regarding U.S. Patent No. 6,766,617 [Doc. No. 199], Case 2:07-cv-109450SFC-MKM, Document 346, Filed Sep. 22, 2009.

*Dura Global Technologies, Inc., Dura Operating Corp., v. Magna Donnelly Corporation, a/k/a Donnelly Corporation*, Magna Donnellly's Invalidity and Unenforceability Contentions, Case 2:07-cv-10945-SFC-MKM, Document 398, Filed Dec. 21, 2009.

*Dura Global Technologies, Inc., Dura Operating Corp., v. Magna Donnelly Corporation, a/k/a Donnelly Corporation*, Plaintiff's Memorandum in Support of its Proposed Claim Construction, Case 2:07-cv-10945-SFC-MKM, Document 408, Filed Apr. 15, 2010.

*Dura Global Technologies, Inc., Dura Operating Corp., v. Magna Donnelly Corporation, a/k/a Donnelly Corporation*, Defendant's Response to Plaintiffs' Memorandum in Support of its Claim Construction, Case 2:07-cv-10945-SFC-MKM, Document 411, Filed May 21, 2010.

(56) References Cited

OTHER PUBLICATIONS

*Dura Global Technologies, Inc., Dura Operating Corp.*, v. *Magna Donnelly Corporation, a/k/a Donnelly Corporation*, Supplemental Notice of Prior Art Under 35 USC 282, Case 2:07-cv-10945-SFC-MKM, Document 412, Filed May 28, 2010.

*Dura Global Technologies, Inc., Dura Operating Corp.*, v. *Magna Donnelly Corporation, a/k/a Donnelly Corporation*, Plaintiff's Reply Brief in Support of its Proposed Claim Construction, Case 2:07-cv-10945-SFC-MKM, Document 415, Filed Jun. 14, 2010.

*Dura Global Technologies, Inc., Dura Operating Corp.*, v. *Magna Donnelly Corporation, a/k/a Donnelly Corporation*, Defendant's Sur-Reply to Plaintiffs' Reply Brief in Support of its Claim Construction, Case 2:07-cv-10945-SFC-MKM, Document 420, Filed Jul. 8, 2010.

*Dura Global Technologies, Inc., Dura Operating Corp.*, v. *Magna Donnelly Corporation, a/k/a Donnelly Corporation*, Amended Exhibit A to Plaintiffs' Draft Reply Brief in Support of its Proposed Claim Construction-Plaintiffs' Claim Interpretation Chart-Revised for Hearing, Case 2:07-cv-10945-SFC-MKM, Document 422, Filed Jul. 21, 2010.

*Dura Global Technologies, Inc., Dura Operating Corp.*, v. *Magna Donnelly Corporation, a/k/a Donnelly Corporation*, Plaintiffs' Supplemental Claim Construction Brief, Case 2:07-cv-10945-SFC-MKM, Document 423, Filed Aug. 2, 2010.

*Dura Global Technologies, Inc., Dura Operating Corp.*, v. *Magna Donnelly Corporation, a/k/a Donnelly Corporation*, Defendant's Supplemental Claim Construction Brief, Case 2:07-cv-10945-SFC-MKM, Document 428, Filed Aug. 9, 2010.

*Dura Global Technologies, Inc., Dura Operating Corp.*, v. *Magna Donnelly Corporation, a/k/a Donnelly Corporation*, Opinion and Order Construing Disputed Claim Terms, Case 2:07-cv-10945-SFC-MKM, Document 438, Filed Oct. 25, 2010.

*Dura Global Technologies, Inc., Dura Operating Corp.*, v. *Magna Donnelly Corporation, a/k/a Donnelly Corporation*, Magna Donnelly's Fifth Supplemental Answers to Dura's First Set of Interrogatories, Case 2:07-cv-10945-SFC-MKM, Dated Jan. 30, 2009.

*Dura Global Technologies, Inc., Dura Operating Corp.*, v. *Magna Donnelly Corporation, a/k/a Donnelly Corporation*, Hricik Supplemental Expert Report, Case 2:07-cv-10945-SFC-MKM, Dated Feb. 26, 2009.

*Dura Global Technologies, Inc., Dura Operating Corp.*, v. *Magna Donnelly Corporation, a/k/a Donnelly Corporation*, Mossinghoff Rebuttal Expert Report, Case 2:07-cv-10945-SFC-MKM, Dated Nov. 19, 2008.

*Dura Global Technologies, Inc., Dura Operating Corp.*, v. *Magna Donnelly Corporation, a/k/a Donnelly Corporation*, Magna Donnelly's Opposition to Dura's Second Motion for Partial Summary Judgement, Case 2:07-cv-10945-SFC-MKM, Document 251, Filed Jul. 28, 2008 (portions of document redacted at the request of the third-party requestor in the current reexamination).

*Dura Global Technologies, Inc., Dura Operating Corp.*, v. *Magna Donnelly Corporation, a/k/a Donnelly Corporation*, Dura's Opposition to Magna Donnelly's First Motion for Partial Summary Judgement, Case 2:07-cv-10945-SFC-MKM, Document 249, Filed Jul. 28, 2008 (portions of document redacted at the request of the third-party requestor in the current reexamination).

*Dura Global Technologies, Inc., Dura Operating Corp.*, v. *Magna Donnelly Corporation, a/k/a Donnelly Corporation*, Magna Donnelly's Second Motion for Partial Summary Judgement, Case 2:07-cv-10945-SFC-MKM, Document 202, Filed Jul. 3, 2008 (portions of document redacted at the request of the third-party requestor in the current reexamination).

*Dura Global Technologies, Inc., Dura Operating Corp.*, v. *Magna Donnelly Corporation, a/k/a Donnelly Corporation*, Magna Donnelly's Brief in Support of its First Motion for Partial Summary Judgement Regarding U.S. Patent No. 6,766,617 Based on the Invalidity of Claims 1-3, 5, 8 and 9 Pursuant to 35 U.S.C. § 102(b), Case 2:07-cv-10945-SFC-MKM, Filed Jul. 3, 2008 (portions of document redacted at the request of the third-party requestor in the current reexamination).

\* cited by examiner

FIG - 9

# MULTI-PANE WINDOW ASSEMBLY WITH TWO-SIDED FRAME AND SLIDING PANE

CROSS-REFERENCE

The present application is a continuation of U.S. application Ser. No. 11/555,808 filed on Nov. 2, 2006, now abandoned, which is a non-provisional application that claims priority benefit of U.S. Provisional Application No. 60/839,083 filed Aug. 21, 2006. The present application claims priority to and the benefit of all the above-identified applications, whose disclosures are hereby expressly incorporated herein.

INTRODUCTION

The present invention is directed to multi-pane window assemblies suitable for use, for example, in motor vehicle bodies, and to the manufacture of such window assemblies. In particular, the invention is directed to multi-pane window assemblies presenting a substantially flush appearance in a window opening, supporting both fixed and sliding panes.

BACKGROUND

Window assemblies which are pre-assembled prior to installation are widely used in motor vehicle manufacture and other applications. Pre-assembly of the glazing unit for simple insertion into a recessed window opening in a vehicle body during vehicle assembly has been found to yield substantial cost and quality advantages. Such window assemblies intended for use as rear windows for pickup truck cabs, for example, typically include a frame holding one or more fixed panes and a slidable pane. In the past, windows assemblies have had an undesirably bulky appearance poorly integrated into the exterior surface of the vehicle or other structure. Exemplary of known window assemblies are those shown and described in U.S. Pat. No. 5,522,191 and U.S. Pat. No. 7,003,916, each of which is hereby incorporated by reference in its entirety for all purposes.

It is an object of the present invention to provide improved multi-pane window assemblies. It is a particular object of at least certain embodiments to provide multi-pane modular window assemblies having fixed and slidably mounted panes and presenting a substantially flush overall appearance. Additional objects and advantages of the multi-pane window assemblies disclosed here will be apparent to those skilled in the art from the following disclosure.

SUMMARY

In accordance with a first aspect of the disclosed inventive subject matter, a window assembly configured for installation in a recessed window aperture, e.g., in a motor vehicle, comprises one or more transparent fixed position panes, one or more sliding panes, and a mounting frame. As further described below, the mounting frame may (and typically does) comprises more than one component. The mounting frame comprises at least a substantially full-circumference, molded plastic frame member and reinforcement integral with the frame member. The mounting frame at least partially defines a window opening. The mounting frame forms a downwardly-open upper slider runway extending laterally above the window opening, and an upwardly-open lower slider runway extending laterally below the window opening. In certain exemplary embodiments the substantially full-circumference, molded plastic frame member of the mounting frame forms such downwardly-open upper slider runway extending laterally above the window opening and upwardly-open lower slider runway extending laterally below the window opening. The sliding pane is slidably positioned in the upper and lower slider runways for sliding movement between a closed position in which it closes the window opening and an open position. The mounting frame mounts the fixed position pane by adhesive surface bonding to a perimeter portion of the interior surface of the fixed position pane, the exterior surface of the fixed position pane being free of adhesive surface bonding to the mounting frame. At least a laterally outboard portion of the peripheral edge of the fixed pane is covered by a portion of the substantially full-circumference, molded plastic frame member that is flush with the adjacent exterior surface of the fixed position pane. A surface (i.e., a portion of the surface, sometimes referred to here as a "show surface" or a show surface portion or an exterior surface or an exterior surface portion) of the full-circumference, molded plastic frame member forms the entire show surface of the window assembly for at least a laterally extending portion the window assembly above or below the window opening. As discussed further below the term "show surface" is used here in accordance with its usual meaning in the motor vehicle industry to mean an exterior surface of the window assembly, i.e., a surface or portion of the surface of the molded frame member which is visible when the window assembly is installed. In certain exemplary embodiments such surface portions of the molded plastic frame member forms at least a portion of the exterior surface of the window assembly above and below the window opening. For example, in certain embodiments a first show surface portion of the frame member forms the entire show surface of the window assembly for at least a laterally extending portion the window assembly above the window opening, and a second show surface portion of the full-circumference, molded plastic frame member forms the entire show surface of the window assembly for at least a laterally extending portion the window assembly below the window opening. Such exterior or show surface portions may both be portions of one continuous show surface, e.g., a show surface that extends as an uninterrupted or continuous exterior surface circumferentially around part or all of the window assembly. In certain exemplary embodiments the aforesaid show surface portion of the full-circumference, molded plastic frame member forms the entire show surface of the window assembly (above or below the window opening) extending laterally at least the full width of the window opening. For example, a first such show surface portion of the frame member, above the window opening, can form the entire show surface for a portion the window assembly extending laterally at least the full width of the window opening, and a second such show surface portion of the frame member, below the window opening, can form the entire show surface for a portion the window assembly extending laterally at least the full width of the window opening.

The reinforcement comprises an elongate reinforcing member extending laterally above or below the window opening. In certain exemplary embodiments the reinforcement comprises an elongate reinforcing member extending laterally above the window opening and laterally beyond it in one or doth directions (i.e., to the right and/or to the left as viewed in FIG. 1), and further comprises another elongate reinforcing member extending laterally below the window opening and laterally beyond it in one or doth directions. In certain exemplary embodiments one or both of such reinforcement members is positioned in the corresponding slider runway, optionally either forming the slider channel which contacts a peripheral edge of the slider pane or receiving another component (e.g., a plastic liner or the like) which forms such slider channel that contacts the slider pane.

An advantageous aspect of at least certain exemplary embodiments of the window assemblies disclosed here is their strength during the post-molded handling and customer operations, such as installation and support of the assemblies. Also, an advantageously flush and uniform appearance can be achieved. In certain exemplary embodiments, the elongate reinforcement member(s) are at least partly embedded in the substantially full circumference molded frame member and extend laterally above or below the window opening behind a "show surface," i.e., a surface portion of the molded frame member which forms the aforesaid exterior surface of the assembly. Advantageously, such exterior surface of the assembly is flush with adjacent (non-recessed) surface of the window aperture. The reinforcement members in such embodiments provide not only structural reinforcement, but also help to eliminate and/or minimize the effects of sink marks and witness lines that would otherwise occur in such exterior surface.

In general, well-designed embodiments of the window assemblies disclosed here provide a desirable flush and smooth look from the exterior. Certain exemplary embodiments also provide additional advantageous features, including, e.g., a two-sided seal lip (a 'D'-shaped or 'v'-shaped lip, etc.) extending radially at the perimeter of the window assembly. The peripheral lip seal can provide a continuous seal surface without steps or offsets. Such lip seal provides, in at least certain embodiments, the following added benefits:
1) a secondary seal to sheet metal for added water management protection;
2) a more arduous path for noise transmission into the cabin area of a vehicle, thereby providing improved NVH, i.e., improved noise prevention performance; and
3) masking or hiding of bonding material which might squeeze or migrate into an area otherwise viewable during installation of the window assembly in a recessed window aperture. This provides greater freedom and more packaging space for the bonded material. It can reduce or eliminate rejects for exposed bonding agent, which has been a problem experienced at assembly plants with so-called raw-edge-of-glass designs.
4) Window assemblies in accordance with the present disclosure may be referred to as two-sided designs. Correspondingly, the substantially full-circumference, molded plastic frame member may be referred to as a two-sided frame member. This refers to a configuration of the frame around some or all of the otherwise raw edge of the fixed or stationary panes, especially the edge at their outboard peripheries. As further described below, the frame member is molded against a peripheral portion of the inside surface of the stationery pane and, in addition, against (at least a portion of) the peripheral edge surface of the pane. The exterior surface of the frame member preferably is flush with the adjacent surface of the fixed pane along this interface. Any variation in the dimension of the glass pane is compensated for by the frame member simply being molded to the raw edge. Thus, a gap-less, flush result is achieved irrespective of tolerance variations in the glass. It is a significant advantage of at least certain embodiments of the window assemblies disclosed here, that the 2-side molded plastic frame provides for this improved tolerance—compared to raw-edge-of glass designs—for inevitable variance in the precise dimensions of stationary glass panes. The 2-sided molded plastic frame also provides for an improved appearance between the stationary glass and the molded plastic frame in the slide glass area. Current products on the market have gaps or margins between the stationary glass edge and the appearance portion of the upper and lower frame areas. These gaps are required for assembled products due to component tolerances. This invention reduces or eliminates these gaps via the 2-sided molding feature, which provides for a gap-less appearance and, in at least certain embodiments, a flush appearance.

Certain exemplary embodiments of the window assemblies disclosed here comprise a 2-piece slider assembly, that is, window assemblies having one stationary glass pane with a hole cut in the center as a window opening and one slide glass to open and close the opening.

Additional features and advantages of the invention will be understood from the following detailed description of certain preferred embodiments.

BRIEF DESCRIPTION OF THE DRAWINGS

Certain preferred embodiments are described and discussed in detail below in association with the appended drawings, wherein.

The drawings referred to above are not drawn necessarily to scale and should be understood to present a simplified representation of only certain embodiments the invention selected for purposes of discussion, illustrative of the basic principles involved. Some features of the window assemblies depicted in the drawings have been enlarged or distorted relative to others to facilitate visualization and understanding.

DETAILED DESCRIPTION OF CERTAIN EXEMPLARY EMBODIMENTS

Window assemblies of the invention will have configurations and components determined, in part, by the intended application and use environment. References to direction and position, unless otherwise indicated, refer to the orientation of the window assembly in the drawing under discussion. In general, "exterior" refers to a direction or position outwardly of the space enclosed by the wall or structure in which the window is installed, e.g., outside the passenger compartment of a motor vehicle. Correspondingly, "inward" or "interior" refers to a direction in or into the passenger compartment or other such space. The term "inboard" is used here (i.e., in this description of the disclosed window assemblies and in the appended claims) to describe a lateral position or location, e.g., the location of the vertical edge of a fixed or stationary pane which is proximate to the slider pane. As viewed in FIG. 1, for example, inboard refers to the lateral position of a feature, i.e., the position from right-to-left in the window assembly embodiment as shown in that drawing. Thus, e.g., the inboard vertical edge of the left-side stationary pane is the right edge of that pane. Likewise, the inboard vertical edge of the right-side stationary pane is the left edge of that pane. Correspondingly, an outboard side, edge or surface is laterally away from the inboard side, edge or surface. Thus, e.g., the outboard vertical edge of the left-side stationary pane is the left edge of that pane.

An "exposed surface" means a surface which is exposed to plain view from the exterior of the window assembly, e.g., outside the vehicle in the case of a window assembly installed in the recessed window aperture of a motor vehicle body panel. It should be understood in this regard that window assemblies of the invention can be adapted for use in any orientation and for architectural and other applications in addition to motor vehicle applications.

It will be understood by those skilled in the art, that various different embodiments of the modular window assemblies disclosed here have numerous uses and applications. For purposes of illustration and not limitation, the following detailed description focuses on a window assembly intended for use as a rear window in a pickup truck or the like. As is well known in the motor vehicle industry, rear window assemblies for pickup trucks frequently comprise one or more fixed panes, together with a centrally mounted slider pane. In the embodiment herein described, there is a right-hand fixed position pane and a left-hand fixed position pane, along with a centrally mounted slider pane. The fixed positions panes are not openable. In contrast, the slidably mounted center pane can be locked in a closed position, in which the window fully seals the window opening, or can be slid horizontally to an open or partially open position.

Figure 1:
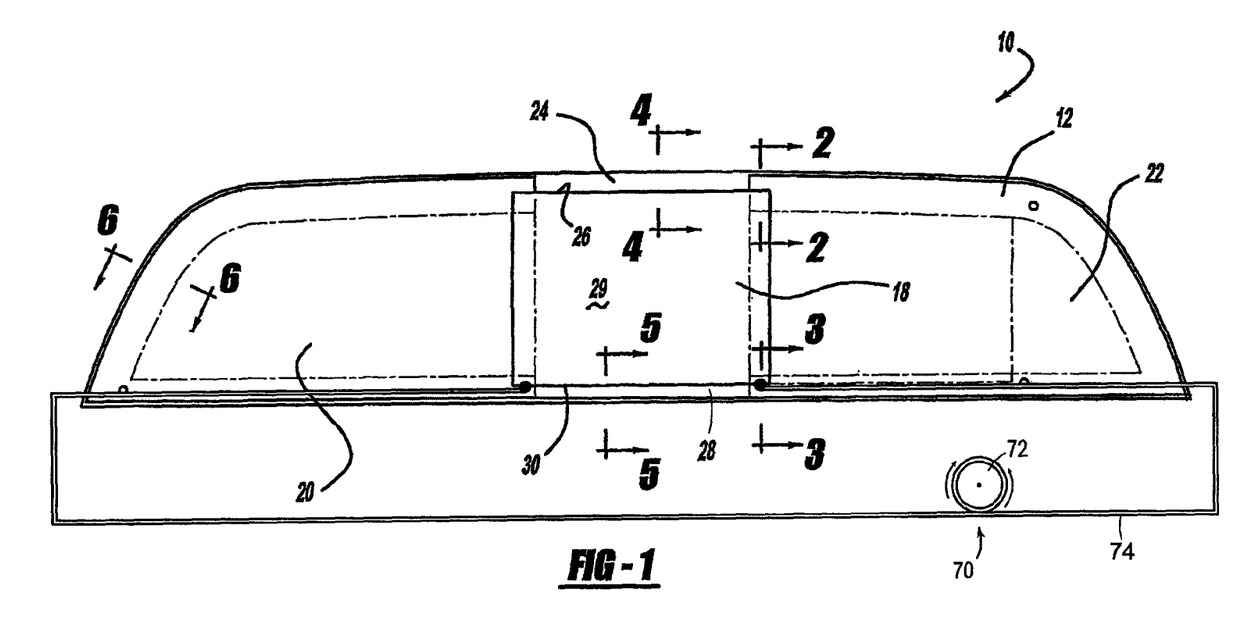
FIG. 1 is a schematic plan view of a motor vehicle window assembly in accordance with a preferred embodiment of the invention.

It should be understood that reference here to a plane, e.g., the plane of travel of the slider pane, is intended to broadly cover true planes, i.e., simple flat surfaces or imaginary spaces, as well as curvo-planar surfaces and shapes (e.g., similar to the surface of a typical motor vehicle's roof or other complex-curved surface) and multi-planar surfaces and shapes where the multiple planes are fairly viewed as all being parts of a larger, generally planar or curvo-planar surface or shape. In certain exemplary embodiments of the modular window assemblies disclosed here, for example, the stationary pane(s) may be curvo-planar, perhaps having an exterior surface which is a complex curve, but which nevertheless is fairly seen to be generally planar. Similarly, the pair of laterally spaced, curvo-planar stationary panes flanking the slider pane in FIG. 1 are in the same plane as that term is used here. Similarly, the slider pane may be curved, i.e., curvo-planar, and yet can be referred to here as being planar and traveling in a vertical plane.

Various different embodiments of the motor vehicle modular window assemblies disclosed here are manually operated, power operated or both. Suitable power drives include, for example, cable-drum window regulators attached to a bottom edge of the sliding pane. Optionally, such power mechanism may employ a smart motor with anti-pinch and one-touch operation features. The applicability of alternative power drive designs for the design and manufacture of the window modules disclosed here will be apparent to those of ordinary skill in the art given the benefit of this disclosure. Window latches, locks and the like can be used with the motor vehicle modular window assemblies disclosed here. In certain exemplary power-driven embodiments, the glass is held in position (closed, full open or in between) by the power drive mechanism.

In certain exemplary embodiments, the window assemblies disclosed here comprise an upper run channel in the upper slider runway and a lower run channel in the lower slider runway.

In certain exemplary embodiments of the window assemblies disclosed here, the reinforcing member extends laterally at least partly in the upper or lower slider runway. In certain exemplary embodiments, the window assemblies disclosed here comprise a run channel in the reinforcing member, the run channel being positioned between the slider pane and the reinforcing member. In certain exemplary embodiments of the window assemblies disclosed here the reinforcing member forms a run channel contacting the slider pane.

In certain exemplary embodiments of the window assemblies disclosed here the reinforcing member extends laterally at least the entire lateral dimension of the slider runway. In certain exemplary embodiments the reinforcing member is at least partly embedded in the full-circumference molded plastic frame member. In certain exemplary embodiments, the reinforcing member extends laterally beyond the window opening both to the right and to the left.

In certain exemplary embodiments of the window assemblies disclosed here the reinforcement member forms at least a generally U-shaped channel positioned at least partially in one of the U-shaped slider runways. In certain exemplary embodiments the reinforcement member is formed of rigid plastic, aluminum or steel. In certain exemplary embodiments the reinforcement comprises a first elongate reinforcing member extending above the window opening and laterally beyond the window opening, and a second elongate reinforcing member extending below the window opening and laterally beyond the window opening. In certain exemplary embodiments the configuration of the reinforcement member is generally a flanged U-shape, with a U-shaped portion positioned at least partially in one of the U-shaped slider runways, and a flange portion at least partially embedded in the substantially full-circumference, molded plastic frame member. The flange portion may be an elongate flat plate comprising a bent-over portion of the same material forming the U-shaped portion. Alternatively, the flange portion can be welded or otherwise integrated with the U-shaped portion. In certain exemplary embodiments of the window assemblies disclosed here at least a section of the flange portion of the reinforcement member extends laterally in the substantially full-circumference, molded plastic frame member in a plane substantially parallel to an overlying section of the surface of the full-circumference, molded plastic frame member which forms at least a portion of the exterior surface of the window assembly. As previously mentioned, such exterior surface of the window assembly may be above and/or below the window opening. In certain exemplary embodiments the reinforcement member comprises at least one generally U-shaped channel made of rigid plastic, aluminum or steel, which is integrally molded with the molded plastic frame member in the upper and/or lower slider runway.

The full circumference frame member can be formed of any suitably strong and resilient, curable polymeric material. The frame member can be formed, for example, by reaction injection molding (RIM). In certain exemplary embodiments of the window assemblies disclosed here the full-circumference, molded plastic frame member is made of a reaction injection molded (RIM) thermoset plastic material. In certain exemplary embodiments of the window assemblies disclosed here the frame member is made of a reaction injection molded polyurethane, RIM polyurethane. The frame member also can be formed of any suitably strong and resilient curable thermoplastic material, such as for example, any thermoplastic elastomer suitable to the intended use, e.g., polyvinylchloride (PVC), TPO, TPU, and other materials which will be apparent to those who are skilled in the art in view of the present disclosure. In certain exemplary embodiments the frame member is made of injection moldable thermoplastic. Standard primers can be used for PVC and other materials.

The exposed surface of the frame member may have any appearance suitable to the intended use and within the ability of those skilled in the art to produce. For example, the surface may be a medium gloss black in the slide glass area. In the window assemblies of the present disclosure, the various stationary and sliding panes may be glass, plastic, etc. Certain embodiments, for example, employ high gloss glass merged with medium gloss PVC and achieve a fully flush window to sheet metal result, including the aforesaid two-sided encapsulation of the stationary glass and the flexible V-lip seal. In at least certain exemplary embodiments manufacturing achieves good slide glass serviceability, good wind, water and whether sealing, etc.

Figures 10, 11:
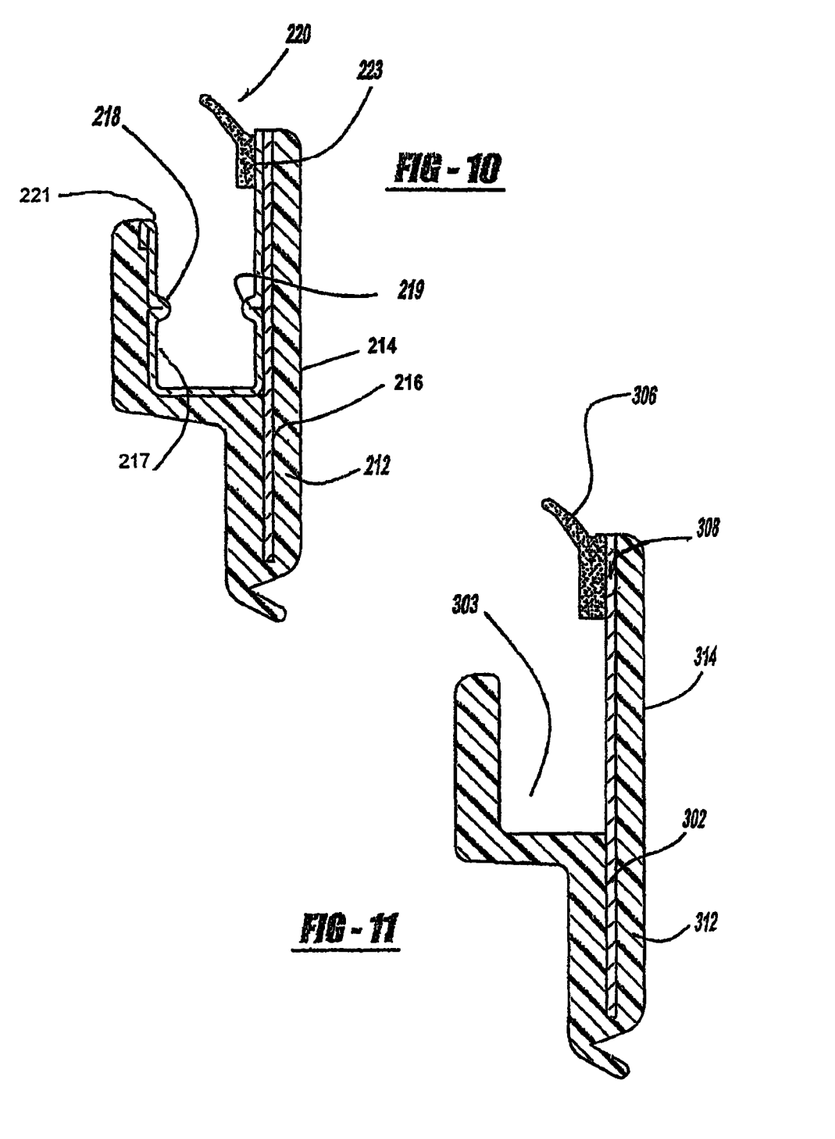
FIG. 10 is an enlarged schematic section view of an alternative embodiment, showing a flanged U-shaped reinforcement member embedded in the frame member at the lower slider runway and having a seal adhesively attached along an outer periphery of the reinforcement member (a substantially mirror image reinforcement arrangement optionally is provided at the upper slider runway)
FIG. 11 is an enlarged schematic section view, corresponding to FIG. 10, of an alternative embodiment, showing a reinforcement member embedded in the frame member at the slider runway and having a seal adhesively attached along an outer periphery of the reinforcement member (here, again, a substantially mirror image reinforcement arrangement optionally is provided at the upper slider runway).

In certain exemplary embodiments of the window assemblies disclosed here, a slide glass seal is mounted in the U-shaped channel. The slide glass seal optionally is adhesively mounted to a peripheral portion of an inside surface of the U-shaped channel, e.g. as shown in FIGS. 10 and 11.

In accordance with certain method aspects of the disclosure, locating pins can be utilized for an improved interface with the sheet metal or other material forming the recessed window aperture into which the window assembly is to be installed. Retention clips may be used at the roof line for an installation in a motor vehicle. Molded-in-place locating pins can be used to aid final assembly and minimize margin variation.

Certain exemplary embodiments of the window assemblies disclosed here further comprise a pull-pull cable-and-drum powered drive assembly 70 operatively connected to the sliding pane and operative to move the sliding pane between the open and closed positions. The pull-pull cable-and-drum powered drive assembly in accordance with certain embodiments comprises a drive drum 72 and a drive cable 74 wrapped around the drive drum 72 and attached to the sliding pane for pulling the sliding pane open and closed by corresponding rotation of the drive drum. Suitable alternative drive assemblies, including both manual and power drive assemblies, will be apparent to those skilled in the art given the benefit of this disclosure.

Optionally, embodiments of the window assemblies disclosed here may further comprise heating elements, such as electrical resistance lines applied to or embedded in the material of the stationary and/or slider panes.

Referring now to the drawings, the window assembly 10 is seen to comprise a full-circumference one-piece molded plastic single-sided frame member 12. The frame is full-circumference in the sense that it forms an unbroken ring of molded plastic material about the outer perimeter of the assembly. In various alternative embodiments the frame member may be substantially continuous, in that some minor gap or separation occurs in a manner which does not (in assembly, and installed) materially adversely diminish the structural integrity or performance characteristics of the window assembly. The continuous one piece frame is advantageous in facilitating mounting and sealing within a window recess provided by the sheet metal of a surrounding vehicle body panel or the like. Such mounting can be accomplished, for example, by adhesive, mounting screws or other mechanical fasteners, or, preferably, both. In the illustrated embodiment, mounting adhesive 16 is shown schematically at the surface-to-surface interface of the frame 12 and sheet metal 14.

Figures 2, 3:
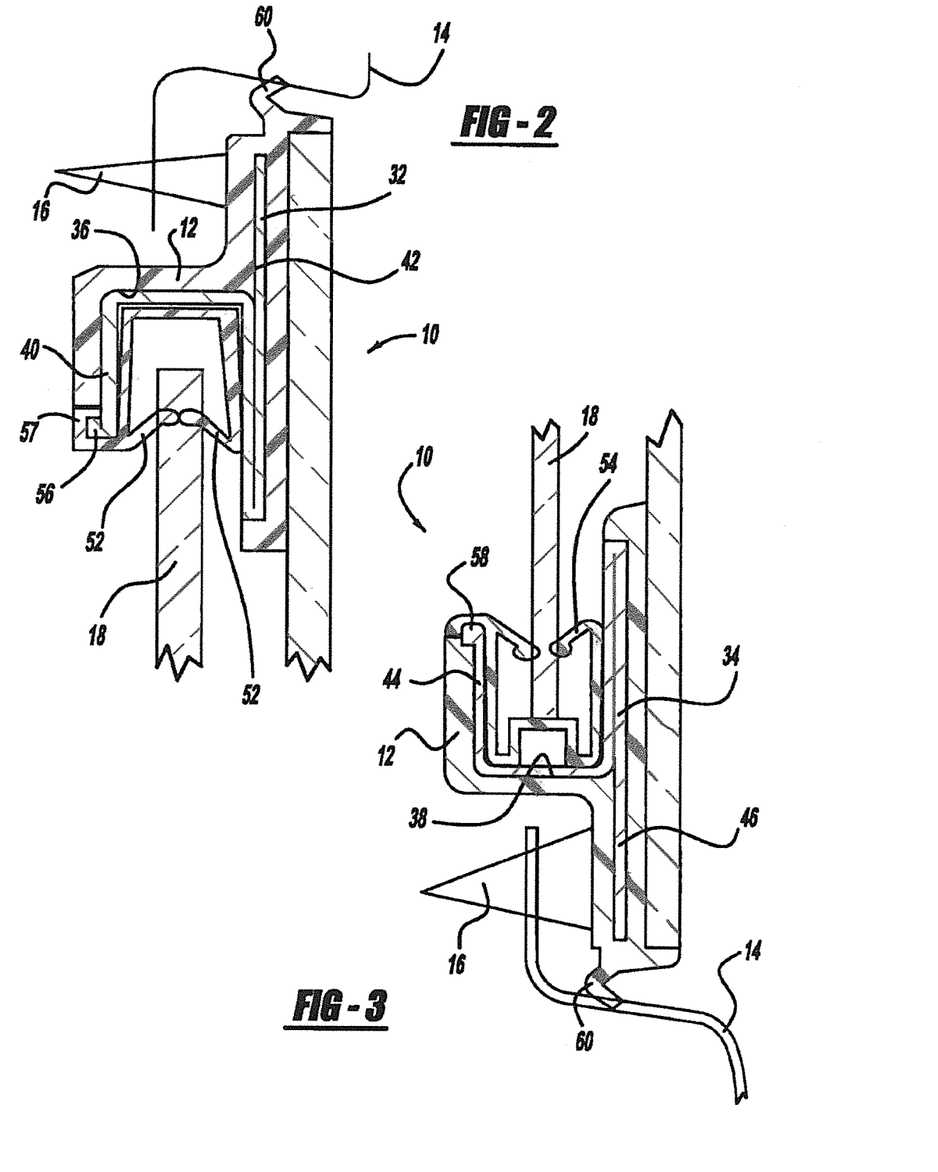
FIG. 2 is an enlarged schematic section view of FIG. 1, taken through the upper run channel proximate the stationary pane.
FIG. 3 is an enlarged schematic section view of FIG. 1, taken through the lower run channel proximate the stationary pane.
Figures 4, 5:
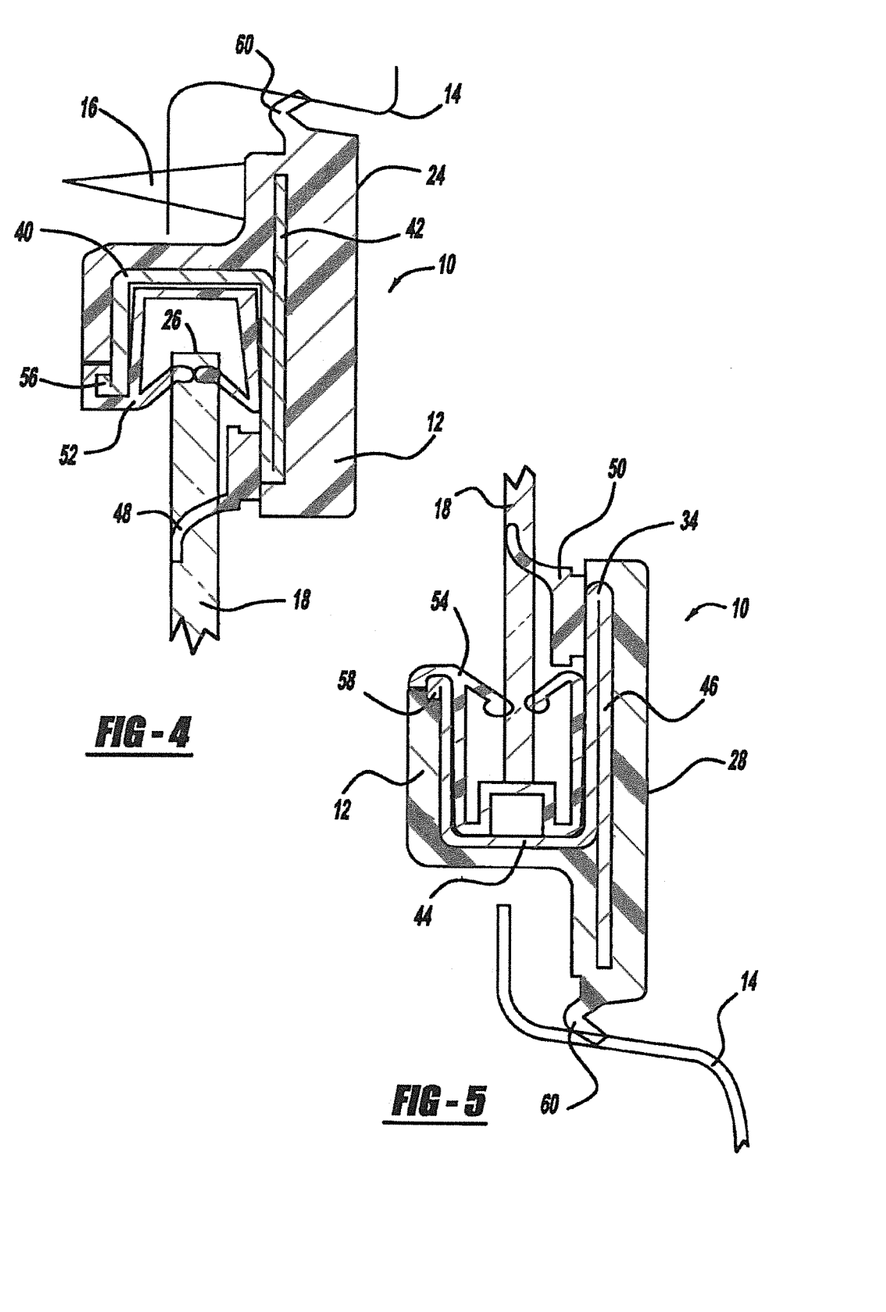
FIG. 4 is an enlarged schematic section view of FIG. 1, taken through the lateral centerline of the window assembly at the upper run channel.
FIG. 5 is an enlarged schematic section view of FIG. 1, taken through the lateral centerline of the window assembly at the lower run channel.

Window assembly 10 comprises a slider pane 18, a left side stationary pane 20 and a right-side stationary pane 22. The surface portion 24 of frame member 12 above upper edge 26 of slider pane 18 is an exposed surface of the window assembly. Similarly, lower surface portion 28 of frame member 12 below the lower edge 30 of slider pane 18 is an exposed surface of the window assembly. In certain preferred embodiments, each of these exposed surface portions is flush with the adjacent surface portions of the stationary panes. In the area above window opening 29, frame member 12 forms a downwardly-open, upper slider runway 36 extending laterally above the window opening 29. In the area below window opening 29, frame member 12 forms an upwardly-open lower slider runway 38 extending laterally below the window opening 29. In addition to any other reinforcement items, the reinforcement of the window assembly includes at least upper reinforcement member 32 embedded in the frame member 12 above the window opening and lower reinforcement member 34 embedded in the frame member 12 below the window opening. Each of the two reinforcement members 32, 34 has a flanged U-shaped configuration. More specifically, reinforcement member 32 has U-shaped portion 40 and flange portion 42. Similarly, reinforcement member 34 as U-shaped member 44 and flange portion 46. As best seen in FIG. 4, flange portion 42 is substantially parallel with exterior surface 24 of the frame member 12 and is embedded in the frame member immediately behind that surface. Advantageously, this aids in reducing sink marks and otherwise in providing a good show surface. Similarly, as best seen in FIG. 5, flange portion 46 is substantially parallel with exterior surface 28 of the frame member 12 and is embedded in the frame member immediately behind that surface. Again, this aids in providing a good show surface in that area. An upper run channel 52 is seen to be seated in the upper slider runway. A lower run channel 54 is seated in the lower slider runway. Alternatively, the reinforcement members could serve as the run channels. U-shaped portion 40 of the upper reinforcement member 32 has a rolled edge 56 for strength and to provide a snap fit with lip 57 of upper run channel 52. U-shaped portion 44 of the lower reinforcement member 34 has a rolled edge 58 for strength and to provide a snap fit for lower run channel 54. A weather seal 48 is provided for the slider pane 18 at the upper run channel. Weather seal 50 is provided at the lower run channel. Frame member 12 further provides V-shaped seal 60 extending radially outwardly to engage sheet metal 14. Referring to FIG. 2, it can be seen that v-seal 60 provides a sight shield to hide any of adhesive 16 which may migrate to a location otherwise visible from the exterior of the window assembly.

Figure 6:
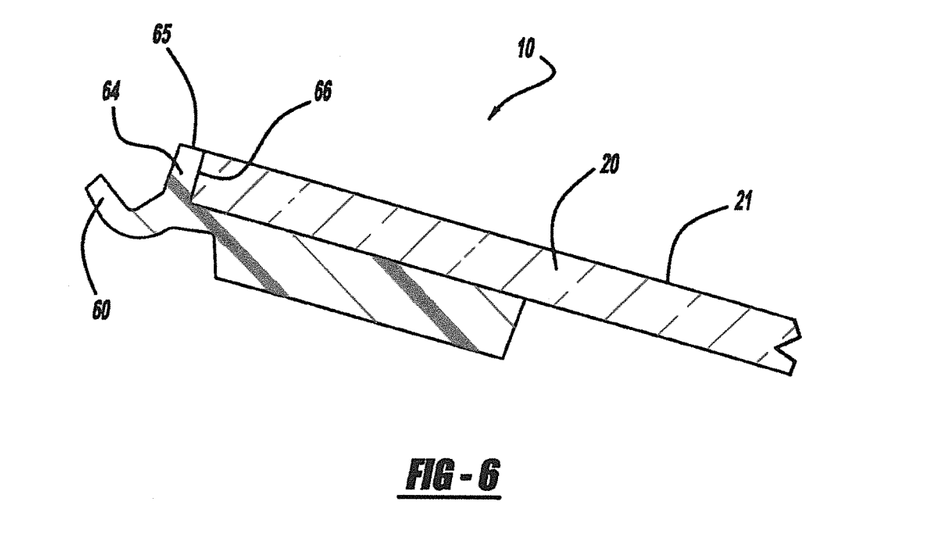
FIG. 6 is an enlarged schematic section view of FIG. 1, taken through the peripheral edge of the stationary pane, showing the flush and gap-less interface of the peripheral edge of the stationary pane and the adjacent portion of the frame member.
Figure 7:
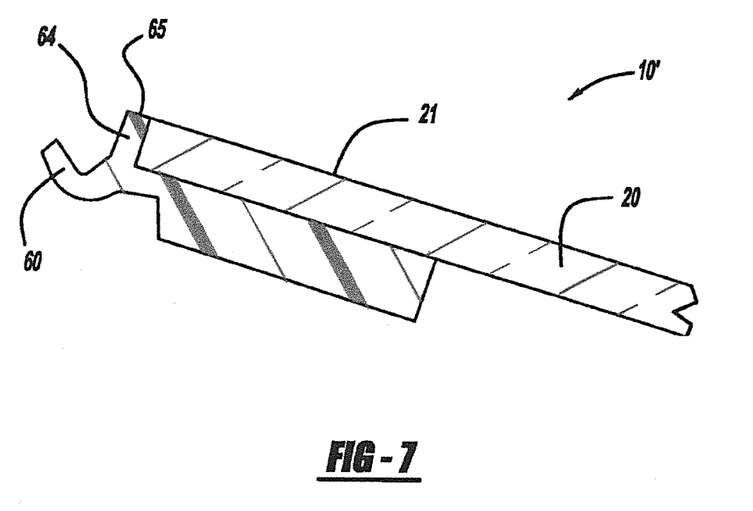
FIG. 7 is an enlarged schematic section view corresponding to FIG. 6, but showing the frame member achieving a flush and gap-less interface with the peripheral edge of a larger (in lateral dimension) stationary pane (resulting in a correspondingly thinner wall of molding material adjacent the peripheral edge of the glass pane)
Figure 8:
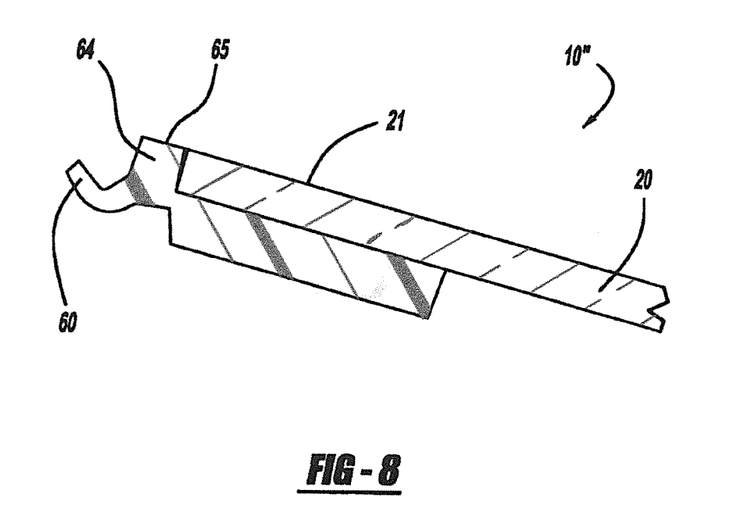
FIG. 8 is an enlarged schematic section view corresponding to FIG. 6, but showing the frame member achieving a flush and gap-less interface with the peripheral edge of a smaller (in lateral dimension) stationary pane (resulting in a correspondingly thicker wall of molding material adjacent the peripheral edge of the glass pane)

Referring now to FIG. 6, it can be seen that portion 64 of frame member 12 covers peripheral edge 66 of stationary pane 20. At their surface contact, peripheral edge surface 66 and wall portion 64 may be merely in contact or closely adjacent, or may be adhesively bonded during the molding process. Further, exterior surface 65 of wall portion 64 is flush with the adjacent exterior surface 21 of stationary pane 20. Corresponding configuration exists for stationary pane 22. If peripheral edge 66 of stationary pane 20 were further to the right (as seen in FIG. 6) wall portion 64 of frame member 12 would fill in the additional space during the molding process and, so, be thicker. Such an embodiment 10" is seen in FIG. 8. If, on the other hand, peripheral edge 66 of stationary pane 20 were further to the left, wall portion 64 on frame member 12 would be thinner. Such an embodiment 10' is seen in FIG. 7. Thus, window assemblies in accordance with at least certain embodiments of the present disclosure provide a gap-less, flush configuration between the stationary pane(s) and the molded plastic frame member along the peripheral edge of the stationary pane at its exterior surface.

Figure 9:
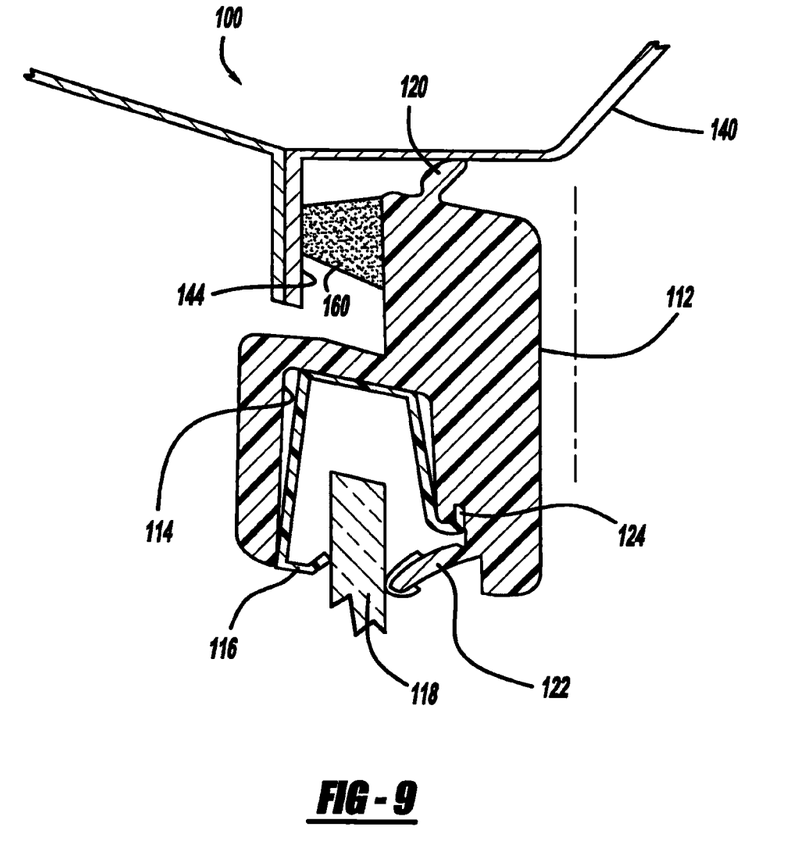
FIG. 9 is an enlarged schematic section view of an alternative embodiment, taken through the upper run channel.

Referring now to FIG. 9, window assembly 100 in accordance with an alternative embodiment is seen to comprise a substantially full-circumference, molded plastic frame member 112. Frame member 112 forms slider runway 114 in which is received reinforcement member 116 which serves as a slider channel for slider pane 118. Frame member 112 provides radially outwardly extending D-lip 120 to sealingly press against sheet-metal 140 when the window assembly is installed in window recess 144 with adhesive 160. Extension 122 provides a seal against slider pane 118. Surface 124 is an exterior show surface for the window assembly.

Referring now to FIG. 10, an alternative embodiment is seen to comprise a substantially full-circumference, molded plastic frame member 212 having exterior show surface 214. Reinforcement 216 behind show surface 214 comprises flanged U-shaped reinforcement member 217 having rolled edge 221 and longitudinally extending bends 218, 219 to provide improved rigidity or strength and optionally to provide a snap fit configuration for a run channel to be received into the U-shaped portion of the reinforcement member. Weather seal 220 is adhered along an outer peripheral portion 223 of the surface of the reinforcement member. In the alternative embodiment of FIG. 11, reinforcement member 302 is seen to be substantially planar in configuration. It is partially embedded in a substantially full-circumference, molded plastic frame member 312 at U-shaped slider runway 303, behind exterior show surface 314. Elongate weather seal 306 is adhered to a peripheral surface portion 308 of reinforcement member 302.

In a vehicle assembly plant assembling vehicles having body panels defining a recessed window aperture into which is installed a modular window assembly in accordance with the present disclosure, adhesive or sealant can be placed on the inside of the window assembly (or onto the surface of the sheet metal of the body panel(s) forming the recessed aperture) as a continuous bead. This aids in preventing air or moisture leakage into the vehicle. One assembly method is to place the window, with adhesive, into the vehicle opening with a robot and have the robot press on the stationary glass to force the window to a flush position. To achieve this flush condition, the adhesive must be forced to flow and take on a different shape. This requires pressure on the adhesive. Most of the window is structurally supported by the relatively stiff fixed glass panes. Pressing on the centers of the fixed glass panes will achieve flushness in that area. In the area of the window opening, the reinforcement (in well designed embodiment of the invention) provides enough stiffness to overcome the resistance of the adhesive and force the adhesive to flow in a uniform manner in the entire area between the fixed glass panes such that this area also becomes flush with the sheet metal without any noticeable waviness.

In an alternative assembly method, the window is manually installed by one or more operators. Here the operators place the window, with adhesive, into the vehicle opening and push the window to a flush condition. "Toy tabs" are provided on the window to assist the operators with window installation. These "toy tabs" are usually made of a thin metal strip securely attached to the window that can be bent over the edge of the sheet metal and both draw the window in and hold it in place till the adhesive at least partially cures. Usually there are three "toy tabs" on the top of the window and three more on the bottom. "Toy tabs" can be located at the four corners and at the top and bottom centers of the window. When the center tab is bent over the sheet metal, that immediate area of the window will be drawn to a flush condition. The reinforcement in this area must be sufficiently stiff such that the entire area between the fixed panes is drawn to the same flush position without any noticeable waviness.

Also, during the assembly of the window, there is an opportunity to damage the window when removing it from the mold and during subsequent assembly operations. If the stiffness of the portion of the window not supported by the fixed glass is not sufficient, then normal handling of the window could produce bending of the frame that could result in cosmetic or structural damage of the assembly.

The polymeric material of the full circumference, one-piece molded plastic frame member is at least partially cured in the molding cavity to form a sufficiently self-supporting sub-assembly comprising the fixed position pane(s) and the above described reinforcement member(s) integrated therewith. The molding cavity can then be opened and the sub-assembly removed for further assembly steps, e.g., addition of upper and lower run channels inserts, weather seals, etc.

It will be appreciated by those who are skilled in this area of technology that the numerous structural advantages discussed above can be achieved in the aforesaid manufacturing process, wherein a full-circumference one-piece molded plastic single-sided frame is formed in a single molding step in which it is simultaneously integrated with reinforcement and substantially the entire exterior flush surface of the final window assembly. Furthermore, variation in the dimensions of the fixed pane(s) is easily accommodated while retaining a flush and uniform appearance. In adding structural integrity to the assembly, as well as an exterior show surface, at least certain embodiments of the frame member can be lighter weight, with resultant material cost savings. These and additional advantages will be readily apparent in view of the foregoing disclosure.

Given the benefit of the above disclosure and description of exemplary embodiments, it will be apparent to those skilled in the art that numerous alternative arrangements and different embodiments are possible in keeping with the general principles of the invention. For example, the stationary panes and or the slider pane may be larger or smaller or have different shapes than those illustrated in the drawings. Various seals, latches and other components may be used. The panes may be wholly or partly opaque and may be formed of glass, plastic or other suitable material(s). Multiple sliding panes may be used. Those who are skilled in this area will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed:

1. A pickup truck rear window assembly comprising:
two stationary panes with a center opening between the stationary panes;
a sliding pane locatable substantially between the stationary panes; and
a molded polymeric material frame member with an exterior surface that includes a show surface visible from an exterior of the pickup truck rear window assembly and with a lower reinforcement at least partially embedded in the frame member behind the show surface, the molded polymeric material frame member forming an upwardly-open lower slider runway extending below the center opening, the lower reinforcement having an upwardly-open portion and a flange portion, the sliding pane being disposed in the upwardly-open portion of the lower reinforcement, the flange portion of the lower reinforcement being disposed proximate to a lower portion of the exterior surface of the polymeric material frame member, and a portion of the lower reinforcement having a thickness created by the lower reinforcement being bent back on itself is embedded in the frame member behind the show surface at a distance from the show surface to support the show surface.

2. The pickup truck rear window assembly of claim 1, wherein the portion of the lower reinforcement having a thickness is created by the lower reinforcement being bent back on itself at a junction of the upwardly-open portion and the flange portion.

3. The pickup truck rear window assembly of claim 1, wherein the thickness of the portion of the lower reinforcement having a thickness is twice as great as a thickness of at least one other portion of the lower reinforcement.

4. The pickup truck rear window assembly of claim 1, wherein a first slide glass seal is mounted to the lower reinforcement.

5. The pickup truck rear window assembly of claim 1 including an upper reinforcement that is at least partially embedded in the molded polymeric material frame member, the molded polymeric material frame member forming a downwardly-open upper slider runway extending above the center opening, the upper reinforcement having a downwardly-open portion and a flange portion, the sliding pane being disposed in the downwardly-open portion, the flange portion of the upper reinforcement being disposed proximate to an upper exterior surface of the polymeric material frame member, and a portion of the upper reinforcement having a thickness created by the upper reinforcement being bent back on itself.

6. The pickup truck rear window assembly of claim 5, wherein the portion of the upper reinforcement having a thickness is created by the upper reinforcement being bent back on itself at a junction of the downwardly-open portion and the flange portion of the upper reinforcement.

7. The pickup truck rear window assembly of claim 5, wherein a first slide glass seal is mounted to the lower reinforcement and a second slide glass seal is mounted to the upper reinforcement.

8. The pickup truck rear window assembly of claim 5, wherein the upper reinforcement is embedded in the frame member behind the show surface to support the show surface.

9. The pickup truck rear window assembly of claim 1 wherein the molded polymeric material frame member comprises PVC.

10. A motor vehicle window assembly comprising:
two stationary panes;
one horizontally slidable pane;
a molded plastic frame member; and
an upper elongate reinforcement that is at least partially embedded in the molded plastic frame member and that extends horizontally behind an upper show surface of the molded plastic frame member, the upper elongate reinforcement having:
a downwardly-open portion that slidably receives said slidable pane; and
a flange portion that extends vertically beyond the downwardly-open portion and that also extends vertically along an entire height of the downwardly-open portion.

11. The window assembly of claim 10, wherein a first glass seal is mounted to the upper elongate reinforcement.

12. The window assembly of claim 11, wherein the first glass seal is adhesively mounted to a surface of the upper elongate reinforcement that faces away from the show surface and toward the slidable pane and a second glass seal is adhesively mounted to a surface of a lower reinforcement, said lower reinforcement surface faces toward the slidable pane.

13. The window assembly of claim 10, wherein the molded plastic frame member forms an unbroken ring of molded plastic material about an outer perimeter of the assembly.

14. The window assembly of claim 10, wherein the flange portion of the upper elongate reinforcement extends from the downwardly-open portion in a direction opposite to a direction in which the downwardly-open portion of the upper elongate reinforcement opens and the flange portion and the downwardly-open portion of the upper elongate reinforcement comprise the same material.

15. The motor vehicle window assembly of claim 10 wherein the molded plastic frame member comprises PVC.

16. A window assembly for a pickup truck comprising: two stationary panes, each having an interior surface, an exterior surface, and a peripheral edge surface;
one horizontally slidable pane;
a molded plastic frame member defining at least part of a window opening, and having a downwardly facing portion and an upwardly facing portion;
an upper elongate reinforcement that is at least partially embedded in the molded plastic frame member and that extends horizontally above the window opening behind an upper show surface of the molded plastic frame member, said upper elongate reinforcement being embedded in said frame member at a distance from the upper show surface to support the show surface, wherein the upper elongate reinforcement includes a downwardly open portion and the upper elongate reinforcement includes a flange portion that extends vertically beyond a top of the downwardly open portion of the upper elongate reinforcement and above the frame member except for a portion of the molded plastic frame member that surrounds the upper elongate reinforcement; and a lower elongate reinforcement that is at least partially embedded in the molded plastic frame member and that extends horizontally below the window opening behind a lower show surface of the molded plastic frame member, said lower elongate reinforcement being embedded in said frame member at a distance from the lower show surface to support the lower show surface, wherein the lower elongate reinforcement includes an upwardly open portion and the lower elongate reinforcement includes a flange portion that extends vertically beyond a bottom of the upwardly open portion of the lower elongate reinforcement and below the frame member except for a portion of the molded plastic frame member that surrounds the lower elongate reinforcement;

wherein the molded plastic frame member surface bonded to a perimeter portion of the interior surface of each of said stationary panes;

wherein the molded plastic frame member includes side portions:

each of said side portions being adjacent to at least a portion of the peripheral edge surface of a corresponding one of the stationary panes, and each of said side portions being coplanar with the exterior surface of the corresponding one of the stationary panes;

wherein the exterior surfaces of said stationary panes is free of bonding to the molded plastic frame member; and wherein the upper and lower show surfaces of the molded plastic frame member are also coplanar with the exterior surfaces of said stationary panes.

17. The window assembly of claim 16, wherein the molded plastic frame member forms an unbroken ring of molded plastic material about an outer perimeter of the assembly.

18. The window assembly of claim 16, wherein the molded plastic frame member includes a perimeter and a lip seal that extends outwardly from the frame member and along the perimeter of the frame member.

19. The window assembly of claim 16, wherein a first slide glass seal is mounted to the upper reinforcement and a second slide glass seal is mounted to the lower reinforcement.

* * * * *